Patented Sept. 12, 1922.

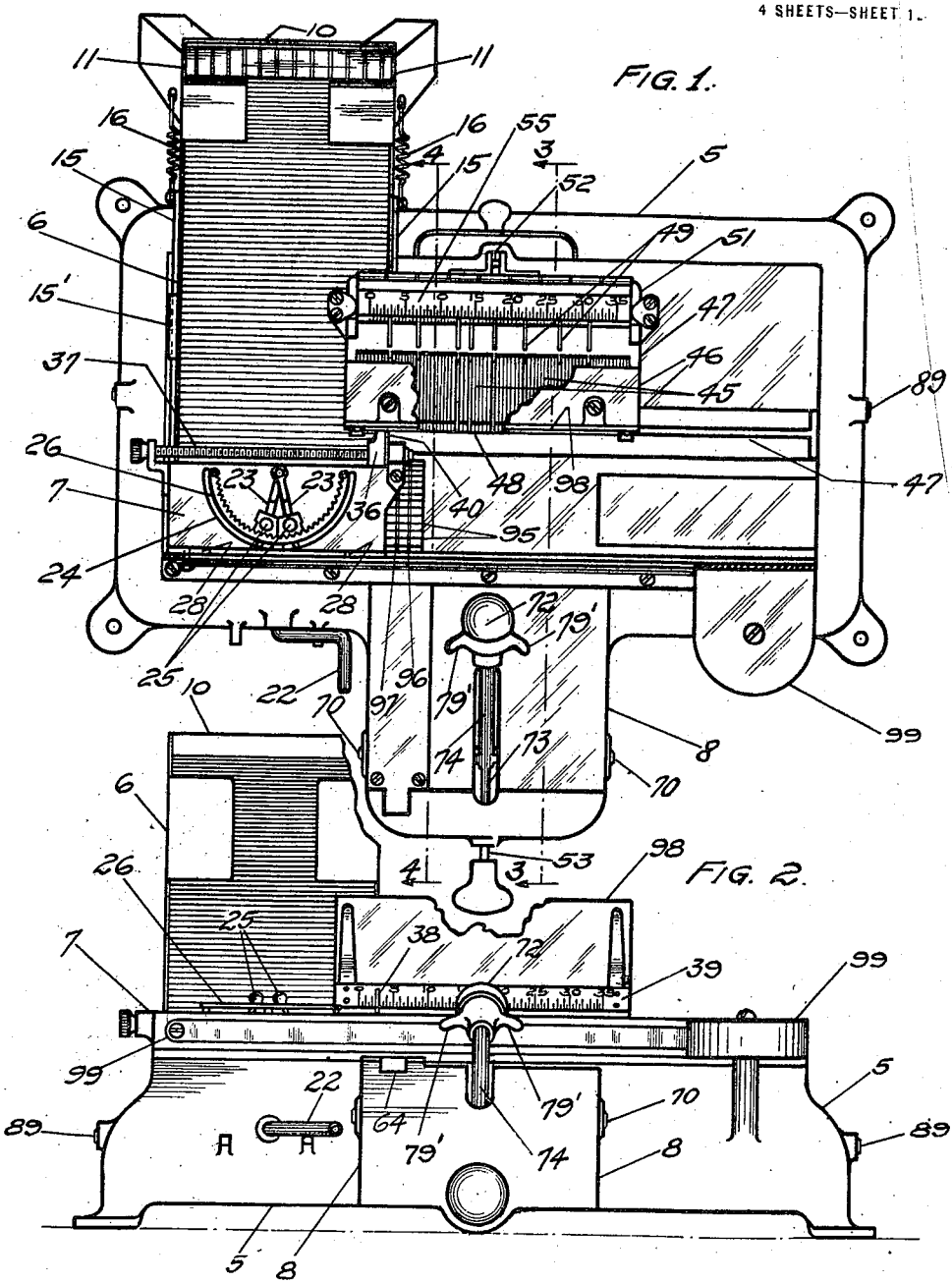

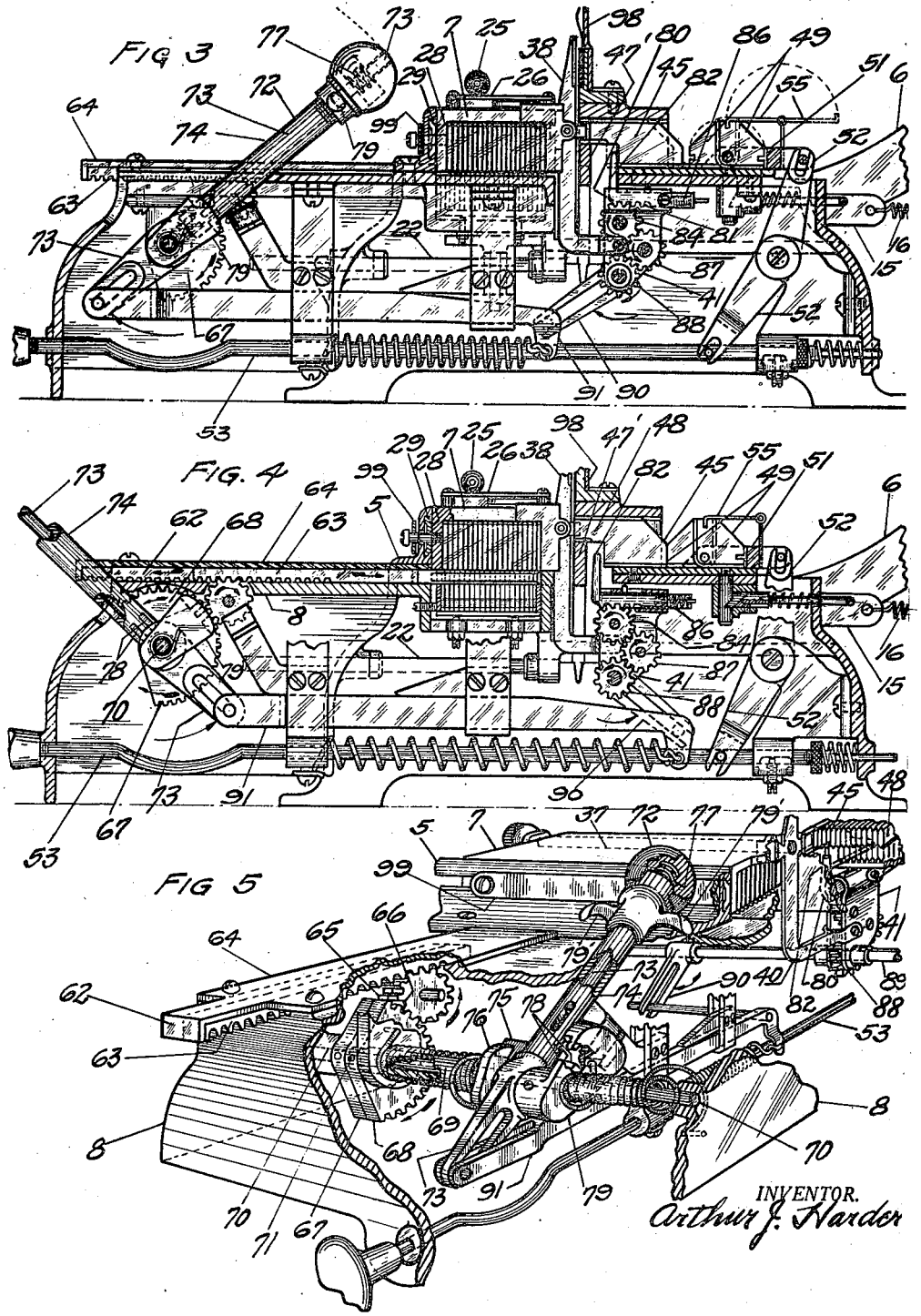

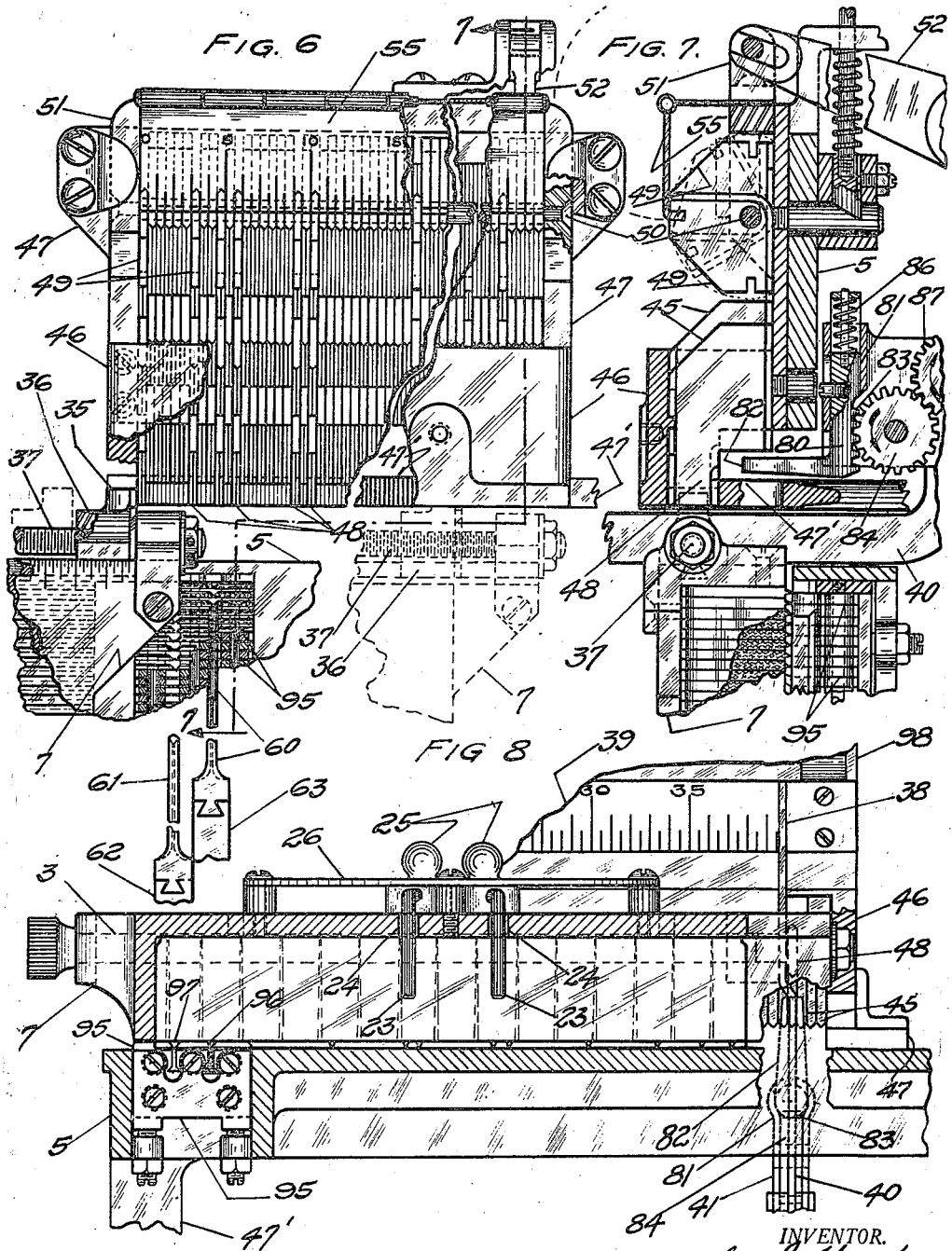

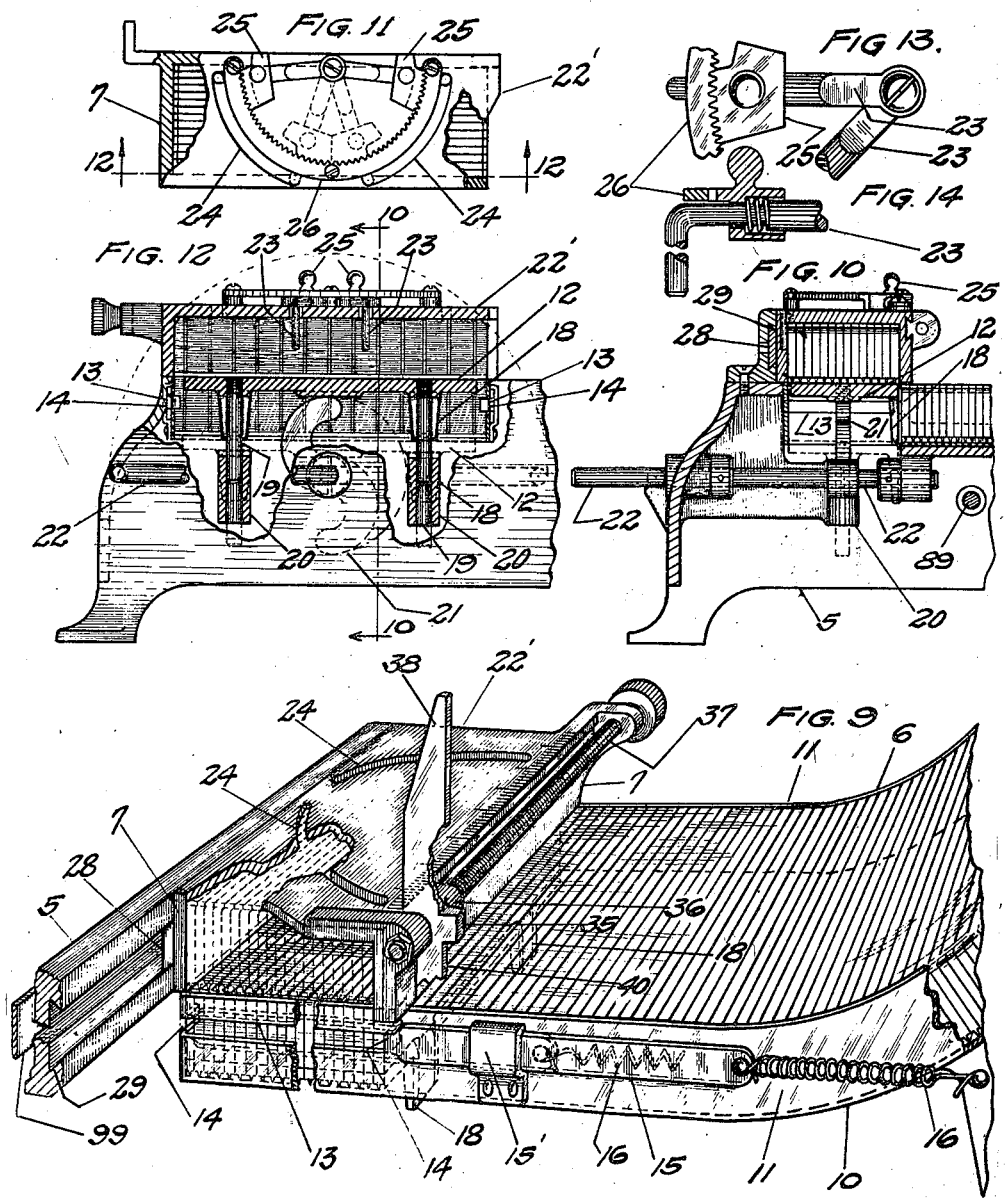

1,429,075

UNITED STATES PATENT OFFICE.

ARTHUR J. HARDER, OF CHICAGO, ILLINOIS.

LINOTYPE-BAR CUTTING OR BROACHING MACHINE.

Application filed January 7, 1920. Serial No. 350,033.

*To all whom it may concern:*

Be it known that I, ARTHUR J. HARDER, a citizen of the United States, residing at Chicago, in the county of Cook and State of Illinois, have invented certain new and useful Improvements in Linotype-Bar Cutting or Broaching Machines, of which the following is a full, clear, concise, and exact description.

This invention relates to linotype bar cutting or broaching machines, and more particularly to a machine for cutting or broaching the slugs used in the setting up of such type bars.

It is the object of this invention to provide a simple and compact machine for rapidly and accurately broaching any desired number of slugs at one setting of the mechanism.

In accordance with one of the features of this invention mechanism is provided whereby when the broaching machine is once set for operation any number of slugs may be broached without resetting the machine. This feature is the result of the use of a movable carriage or container which moves the slugs across the path of movement of the broaches in accordance with the setting of stops controlled by adjustable segments which when once set are capable of moving the stops into operative position any desired number of times until released by the operator.

Other features of this invention relate to the details of the mechanism for feeding and adjusting the blanks to the cutting level, to the combination of parts for controlling the feeding movement of the slug carrying mechanism, to the means for obtaining any desired spacing of the broaches, and to other details of construction and combinations of parts as will be hereinafter more fully pointed out.

In the drawings:

Fig. 1 is a plan view of a machine embodying the features of this invention;

Fig. 2 is a view in front elevation of the machine;

Fig. 3 is a sectional view taken upon line 3—3 of Fig. 1;

Fig. 4 is a sectional view taken upon line 4—4 of Fig. 1 with the parts in a different position from that shown in Fig. 3;

Fig. 5 is a fragmentary perspective view of a part of the mechanism shown in Fig. 3;

Fig. 6 is a fragmentary plan view upon an enlarged scale of the stop and adjusting mechanism;

Fig. 7 is a fragmentary front elevational view of parts shown in Fig. 6;

Fig. 8 is a detail sectional view illustrating the carriage in approximately the final step of the cutting position;

Fig. 9 is a perspective view with parts broken away, showing means for feeding the slugs into the carriage;

Fig. 10 is a detail sectional view taken upon line 10—10 of Fig. 12 and showing a carriage full of slugs ready to be moved into broaching position;

Fig. 11 is a plan view of a clamping means for securing the slugs in the carriage;

Fig. 12 is a sectional view taken upon line 12—12 of Fig. 11;

Figs. 13 and 14 are detail views of the clamping means.

As shown in the drawings, 5 designates a main supporting frame at one end of which is located a reservoir or hopper 6 for type bar slugs and a movable carriage 7 adapted to receive slugs from the hopper 6 and move them into broaching position. Intermediate the ends of the frame 5 and at one side thereof is a casing 8 enclosing a part of the broaching mechanism. In line with the broaching mechanism is mechanism for controlling the feed of the slug carriage.

As more clearly shown in Fig. 9, the hopper 6 comprises a bottom plate 10 and a pair of side plates 11, 11 sloping downwardly in a curve from a point above the mechanism and opening beneath the carriage 7 onto a platform or elevator 12. At their lower ends the side plates 11, 11 are provided with slots 13 only one of which is shown. Projecting through the slots is a hook 14 on a slide 15 located in a guide 15 on the side of the plate 11 and attached at its other end to a spring 16 by means of which it is normally drawn to and held against the right hand end of the slot 13. This slide is for the purpose of retaining the slugs in the hopper during the time that the elevator 12 is delivering its load to the carriage 7.

As shown in Figs. 12 and 9, the elevator 12 comprises a platform 18 mounted upon plungers 19, 19 sliding in guides 20—20.

Rotatably mounted beneath the platform 18 is a two-wing cam 21, the wings thereof being located 180° apart and adapted to be rotated by a shaft 22 extending through the frame 5 to raise and lower the platform. Pivotally secured to a plate 22' on the upper part of the carriage 7 are a pair of arms 23, 23, the lower ends of which are bent over at right angles to extend through curved slots 24, 24 in said plate and clamp the slugs into the carriage. Spring pressed toothed quadrants 25, 25 on said arms 23, 23 are adapted to engage a toothed rack 26 secured to the plate 22' to lock said arms in their adjusted position.

At its front side the carriage 7 is provided with a tongue 28 slidably engaging a groove 29 in the frame 5 and at its rear side it is slidably supported by means hereinafter described. Mounted to move with the carriage 7 is a stop member 35 which is provided with a nut 36 through which extends a micrometer screw 37, one end of which is provided with a knob for adjusting it. Projecting upwardly from the stop member 35 is an indicating finger 38 which moves over a scale 39. A downwardly projecting arm 40 on said stop is secured to a slidable plate 41, the purpose of which will be hereinafter described.

To the rear of the slug carriage 7 are a plurality of slidable stop members 45, 45 adapted to cooperate with the stop member 35 to control the movement of the carriage 7. As more clearly shown in Figs. 3 and 4, these slidable stop members 45, 45 are mounted between upper and lower plates 46, 47, and 47' which are provided with suitable grooves to receive the edges of said slidable stop members which are suitably beveled, as indicated in Fig. 8. Each of the slidable stop members 45 is provided with a finger 48 which is adapted to be moved into the path of the stop member 35 on the carriage 7. To the rear of the slidable stop members 45, 45 are a plurality of pivotal and slidable quadrants 49, 49, one for each of said slidable stop members. These quadrants are mounted upon a common shaft 50 which is connected by means of links 51, 51 to a bell crank lever 52 adapted to be operated by a plunger 53 to slide said quadrants forward on the plate 47. In their normal position the forward movement of said quadrants 49, 49 will have no effect upon the slidable stop members 45, 45, but as these quadrants are swung through an angle of 180° they will present a projecting surface toward the ends of the slidable stop members 45, 45 which upon the operation of the plunger 53 will displace these stop members from normal and present the fingers 48 thereof in the path of movement of the stop member 35. The quadrants are manually adjusted in accordance with the cutting to be made in the slug and are latched in such position by means of a pica scale latch member 55 which engages notches in the upper surfaces of the set quadrants. This scale is for checking the setting of the quadrants as well as locating them. After each operation of the plunger 53 to set the slidable stop members 45, 45 the quadrants will be moved away from engagement with the said slidable stop members a distance sufficient to permit them to be moved back out of the path of the stop member 35.

Broaching dies 60, 61 are secured to the ends of racks 62, 63 which are slidable in a supporting plate 64 secured to a portion of the frame 5. Engaging the racks 62, 63 are pinions 65, 66 which are engaged by and operated by gear quadrants 67 and 68. The quadrant 68 is secured to a sleeve 69 rotatable upon a shaft 70 to which the quadrant 68 is secured by means of a pin 71 extending through a slot, not shown, in the sleeve 69. The quadrants are adapted to be selectively operated by means of an operating arm 72 comprising a rod 73 and a sleeve 74 adapted to slide thereon. In its normal position a lug 75 on the lower end of the sleeve 74 engages a notched projection 76 on the sleeve 69 to operate the segmental gear 68 to operate broaching die 60. In case it is desired to operate the die 61, the sleeve 74 is moved upwardly on the rod 73 against the action of a spring 77, thereby causing a projecting lug 78 thereon to engage a slotted member 79 secured to the shaft 70. Ears 79', 79' are provided for convenience in operating this sleeve 74.

After each broaching operation of the handle 73 the adjusted stop 45 which engaged the stop member 35 to limit the movement of the slug carriage 7 is moved backwardly against its corresponding quadrant. To accomplish this there is provided a spring pressed plunger 80 slidable in a guide 81 and having a right angled tripper finger 82 adapted to engage a slidable stop 45 below the finger 48 thereon. Provided upon the lower portion of this plunger 80 are rack teeth 83, 83 adapted to cooperate with a pinion 84. A compression spring 86 located at one end of this plunger is adapted to normally hold it in position to maintain the right angled portion 82 in a forward position just clearing the end of the slidable stop 45 below the finger 48 thereon. The teeth of the pinion 84 are in mesh with an idler 87 which in turn is in mesh with a pinion 88 carried by a shaft 89 which has a feathered connection with a crank arm 90 operated by an arm 91 connected with the lower end of the operating lever 73. The pinions 84, 87, and 88 are carried by the slidable plate 41 and are therefore movable with the lug carriage 7 connected with the bar 40. When the lever 73 is pulled toward the operator to broach the positioned slugs the pinion 88 will be rotated in a counter-clockwise direction, the pinion 87 in a clockwise direction, and the pinion 84 in a counter-clockwise direction to bring the teeth thereon into engagement with the rack teeth 83, 83, thereby moving the plunger 80 forwardly to clear the projecting end of the slidable stop 45. As the handle 73 is returned to normal position after the broaching operation the teeth of pinion 84 will operate upon teeth 83, 83 of the plunger 80 to return the tripper finger 82 causing it to engage the stops 45 and move it back to normal position to permit the succeeding movement of the carriage 7 into engagement with the succeeding stop member. The spring 86 always being under compression, the rearward movement of the tripper finger 82 will not begin until the broaching die is withdrawn after the cutting operation or at about the time the carriage starts its lateral movement.

Fins 95, 95 provided with openings 96, 97 serve as guides and supports for the broaching dies and also as backings for the slugs while they are being broached.

A copy holder may be provided as shown at 98.

A spring motor 99 is provided for moving the carriage 7.

In the operation of this mechanism the broaching for the slugs having been determined, the operator will set the quadrants 49, 49 in accordance with the stops 45, 45 to be interposed in the path of the carriage 7. After being set, the quadrants 49, 49 will be locked in position by the pica scale latch 55. The carriage 7 will now be moved to the left to the limit of its movement and the plunger 53 will be pushed away from the operator to set the slidable stop members. The next operation will be to raise the platform 12 of slugs into the carriage 7 and adjust the clamping means to hold them therein. The machine is now ready for operation and the operation will proceed as rapidly as the operator can manipulate the lever 73. Any number of slugs may be broached with the same setting of the quadrants 49, 49.

The movable stop members 45, 45 cooperating with the stop members 35 give a spacing which can be measured in half picas. In case a spacing is desired which is measurable in less than half picas it is obtained through the adjustment of the stop member 35 by means of the micrometer screw 37. This will enable the cuttings to be made very accurately for small fractions of a pica.

The broaching dies 60 and 61 are adapted to cut notches of different contours. These dies are separated a distance equal to some multiple of a half pica so that the operator in setting the adjustable stops will allow for the distance between these stops in order to obtain the proper spacing from the end of the slug.

What is claimed is:

1. In a broaching machine for slugs, a longitudinally operable broaching die, a slug carriage, means for stepping said carriage transversely of said broaching die upon each operation of said die, and means for determining the length of each step of said carriage.

2. In a broaching machine for slugs, a longitudinally movable broaching die, a slug carriage, means for reciprocating said broaching die to broach the slugs in said carriage, means for moving said carriage after each broaching cut, and stop members adapted to limit the movement of the carriage after each cut to determine the spacing of the cuts.

3. In a broaching machine for slugs, a reciprocal broaching die, a slug carriage adapted to move step by step transversely of said die after each operation of said die, a plurality of stop members controlling the length of steps of said carriage, and means for successively moving said stop members out of the path of movement of the carriage.

4. In a broaching machine for slugs, a reciprocal broaching die, a slug carriage adapted to move step by step transversely of said die after each operation of said die, a plurality of stop members controlling the steps of said carriage, means for successively moving said stop members out of the path of movement of said carriage, and means for resetting all of said stop members simultaneously into their previously set position.

5. In a broaching machine for slugs, a reciprocal broaching die, a slug carriage adapted to move step by step transversely of said die after each operation thereof, stop members for controlling the steps of said carriage, and means controlled in the operation of said die to move each of said stops out of the path of movement of the carriage after each operation thereof.

6. In a broaching machine for slugs, a reciprocal broaching die, a slug carriage movable step by step transversely of said die, a plurality of adjustable stop members for limiting the stepping of said carriage in accordance with a predetermined setting.

7. In a broaching machine for type-bar slugs, a reciprocal broaching die, a slug carriage movable step by step transversely of said broaching die, slidable stop members for determining the stepping movement of said carriage, adjustable quadrants for determining the setting of said stop members, means controlled in the movement of the carriage to successively move said stop members from the path of the carriage, and means to move all of said quadrants simultaneously to reset the selected ones of said stop members into the path of movement of the carriage.

8. In a broaching machine for type-bar slugs, a slug carriage, a pair of reciprocal broaching dies of different contours, and means for selectively actuating said dies.

9. In a broaching machine for type-bar slugs, a slug carriage, a pair of reciprocal broaching dies of different contours, a shaft by means of which one of said dies is operated, a sleeve by means of which the other of said dies is operated, an actuating handle and means for locking said handle either to said shaft or to said sleeve at will.

10. In a machine for broaching type-bar slugs, a broaching die, a carriage for feeding the slugs into broaching position, a container for said slugs, and means for moving slugs from said container into said carriage.

11. In a machine for broaching type-bar slugs, a broaching die, a carriage for feeding the slugs into broaching position, a container for unbroached slugs, a platform adapted to receive slugs from said container, and means for moving said platform to deliver the slugs to the container.

12. In a machine for broaching type-bar slugs, a broaching die, a carriage for moving said slugs into broaching position, a delivery chute for the slugs opening below the level of the carriage, a vertically movable platform upon which slugs are delivered from the chute, and means for moving said platform to deliver slugs from the chute to the carriage.

13. In a machine for broaching type-bar slugs, a broaching die, a carriage for moving said slugs into broaching position, a delivery chute for the slugs having its delivery end below the level of the carriage, a platform upon which slugs are delivered from the chute, means for elevating said platform to deliver the slugs to the carriage, and means for retaining the remaining slugs in the container during the movement of the platform.

14. In a machine for broaching type-bar slugs, a broaching mechanism, a carriage for moving the slugs into position to be broached, means for feeding a plurality of slugs into said carriage, and adjustable locking means for securing any number of slugs therein from one to the full capacity of the carriage.

15. In a machine for broaching type-bar slugs, a broaching mechanism, a carriage for moving the slugs into position to be broached, a container for said slugs opening below the level of said carriage, means for moving said slugs from said container to said carriage, and means for gripping and retaining said slugs in said carriage.

In witness whereof, I hereunto subscribe my name this 3rd day of January A. D., 1920.

ARTHUR J. HARDER.